US008426730B2

(12) United States Patent
Widmer et al.

(10) Patent No.: US 8,426,730 B2
(45) Date of Patent: Apr. 23, 2013

(54) HIGH-VOLTAGE ISOLATOR WITH FIELD CONTROL ELEMENT

(75) Inventors: Bruno Widmer, Jona (CH); Jean-Claude Mauroux, Hunzenschwil (CH); Michael Conry, Dublin (IE); Martin Lakner, Gebenstorf (CH)

(73) Assignee: ABB Technology AG, Zurich (CH)

( * ) Notice: Subject to any disclaimer, the term of this patent is extended or adjusted under 35 U.S.C. 154(b) by 261 days.

(21) Appl. No.: 13/026,521

(22) Filed: Feb. 14, 2011

(65) Prior Publication Data
US 2011/0180292 A1 Jul. 28, 2011

Related U.S. Application Data

(63) Continuation of application No. PCT/EP2009/058726, filed on Jul. 9, 2009.

(30) Foreign Application Priority Data

Aug. 14, 2008 (EP) .................................... 08162351

(51) Int. Cl.
*H01B 12/00* (2006.01)
(52) U.S. Cl.
USPC ........................................................ 174/15.5
(58) Field of Classification Search ............... 174/15.5, 174/15.4, 19, 73.1, 137 R, 140 C, 142–143, 174/178, 179, 135, 152 G
See application file for complete search history.

(56) References Cited

U.S. PATENT DOCUMENTS 6,049,036 A * 4/2000 Metra ........................ 174/15.5
(Continued)

FOREIGN PATENT DOCUMENTS

| EP | 0810705 A1 * | 4/1997 |
| EP | 1657731 A1 | 5/2006 |
| EP | 1933347 A1 | 6/2008 |
| JP | 1-154419 A1 | 6/1989 |

OTHER PUBLICATIONS

International Search Report (PCT/ISA/210) issued on Sep. 8, 2009, by European Patent Office as the International Searching Authority for International Application No. PCT/EP2009/058726.

(Continued)

*Primary Examiner* — William Mayo, III
(74) *Attorney, Agent, or Firm* — Buchanan Ingersoll & Rooney PC

(57) ABSTRACT

A high-voltage isolator is disclosed which has a first electrical connecting piece and a second electrical connecting piece, between which an electrical isolating body extends. The end sections of the connecting pieces are connected to the isolating body, with a toroidal field control element being arranged on at least one of the end sections. A slot, which extends in the circumferential direction of the end section, is introduced on the end section which has the field control element. The field control element and the respectively associated end section are formed integrally. As a result of the slot, tension and compression forces which occur during longitudinal and lateral contractions of the isolating body and act at right angles to the longitudinal axis of the end section can be largely prevented, as can shear forces, while at the same time achieving a high level of uniformity in an area of the isolating gap, for electrical fields which occur during operation.

20 Claims, 2 Drawing Sheets

U.S. PATENT DOCUMENTS

| | | | | |
|---|---|---|---|---|
| 6,087,590 | A | * | 7/2000 | Meinherz et al. .......... 174/99 R |
| 6,521,839 | B1 | | 2/2003 | Komatsu et al. |
| 6,534,721 | B2 | * | 3/2003 | Hoefner .................... 174/158 R |
| 6,624,360 | B2 | * | 9/2003 | Meinherz .................. 174/152 R |
| 7,262,367 | B2 | * | 8/2007 | Donzel et al. ................ 174/142 |
| 2006/0102618 | A1 | | 5/2006 | Lakner et al. |
| 2007/0209790 | A1 | | 9/2007 | Kiefer et al. |

OTHER PUBLICATIONS

Written Opinion (PCT/ISA/237) issued on Sep. 8, 2009, by European Patent Office as the International Searching Authority for International Application No. PCT/EP2009/058726.

European Search Report dated Dec. 23, 2008 for European Application No. 08162351.4.

* cited by examiner

_US 8,426,730 B2_

HIGH-VOLTAGE ISOLATOR WITH FIELD CONTROL ELEMENT

RELATED APPLICATIONS

This application claims priority as a continuation application under 35 U.S.C. §120 to PCT/EP2009/058726, which was filed as an International Application on Jul. 9, 2009, designating the U.S., and which claims priority to European Application 08162351.4 filed in Europe on Aug. 14, 2008. The entire contents of these applications are hereby incorporated by reference in their entireties.

FIELD

The present disclosure relates to the field of high-voltage technology, including high-voltage isolators, and cooling elements and high-power switches having a high-voltage isolator.

BACKGROUND INFORMATION

High-voltage isolators are known, for example, from EP 1 933 347 A1. A tubular high-voltage isolator can have an epoxy isolating tube, which is adhesively bonded at both of its ends into annular metal holders. The end of the metal holder facing the isolating body is toroidal and is used to homogenize the electrical fields which act during operation. The torus itself may have slots which run in the axial and at the same time in the radial direction of the torus, this subdividing the torus into segments arranged in the form of a ring, in order to reduce stiffness of the torus. Apertures or slots provided in this way on the torus can affect the operation of the torus as a field control element and can allow lateral forces which occur to be passed to the isolating tube, which is rigidly adhesively bonded to the holder, and this can lead to damage to the isolator.

EP 1 657 731 A1 discloses a high-voltage switch which is in the form of a generator switch and has a cooling element, in which the cooling element extends between the current-carrying inner conductor and the encapsulation of the switch. An isolating tube composed of glass is provided between the evaporator and condenser, for electrical isolation between the cooling element evaporator on the high-voltage switch housing and the cooling element condenser on the inner conductor, which is at high voltage. Tubular connection pieces on both sides of the isolating tube connect the isolating tube to the evaporator and condenser. Together with the evaporator and the condenser, the isolating tube forms a cooling element.

U.S. Pat. No. 6,521,839 discloses a switching device in whose interior a switching rod is guided. The switching rod has a cylindrical isolating tube, in each of whose two ends a solid connecting rod is guided. The isolating tube and the connecting rod are secured with respect to one another by a countersunk bolt, thus preventing axial play between the isolating tube and the connecting rod. The junction area between the isolating tube and the connecting rod is surrounded by a metal ring, which is provided with a groove, in order to relax the electrical fields.

JP 01154419 discloses a switching device which has a switching rod. The switching rod has an isolating tube which is held by an adapter piece in the form of a cup. The adapter piece contributes to the reduction of electrical fields that occur.

SUMMARY

A high-voltage isolator is disclosed comprising: a first hollow electrical connecting piece; a second hollow electrical connecting piece; an electrical isolating body which extends between the first connecting piece and the second connecting piece and is connected in a gas-tight manner to an end section of the first connecting piece and to an end section of the second connecting piece; an annular field control element integrally formed on at least one of the end sections; and at least one slot, which extends in the circumferential direction of the at least one end section, between the at least one end section and the field control element, for mechanical decoupling the field control element from the at least one end section.

A heat pipe is disclosed comprising: a condenser; an evaporator; and a high-voltage isolator, which forms an electrical isolating gap between the evaporator and the condenser and has a first hollow electrical connecting piece, a second hollow electrical connecting piece and an electrical isolating body, wherein the isolating body extends between the first connecting piece and the second connecting piece and is connected in a gas-tight manner to an end section of the first connecting piece and to an end section of the second connecting piece, and wherein a field control element is arranged at least on one of the end sections, wherein a connection between the at least one end section and the field control element has at least one slot which extends in a circumferential direction of the at least one end section, for mechanical decoupling of the field control element from the at least one end section.

BRIEF DESCRIPTION OF THE DRAWINGS

The subject matter of the disclosure will be explained in more detail in the following text with reference to exemplary embodiments, which are illustrated in the attached drawings, in which, schematically.

Figure 1:
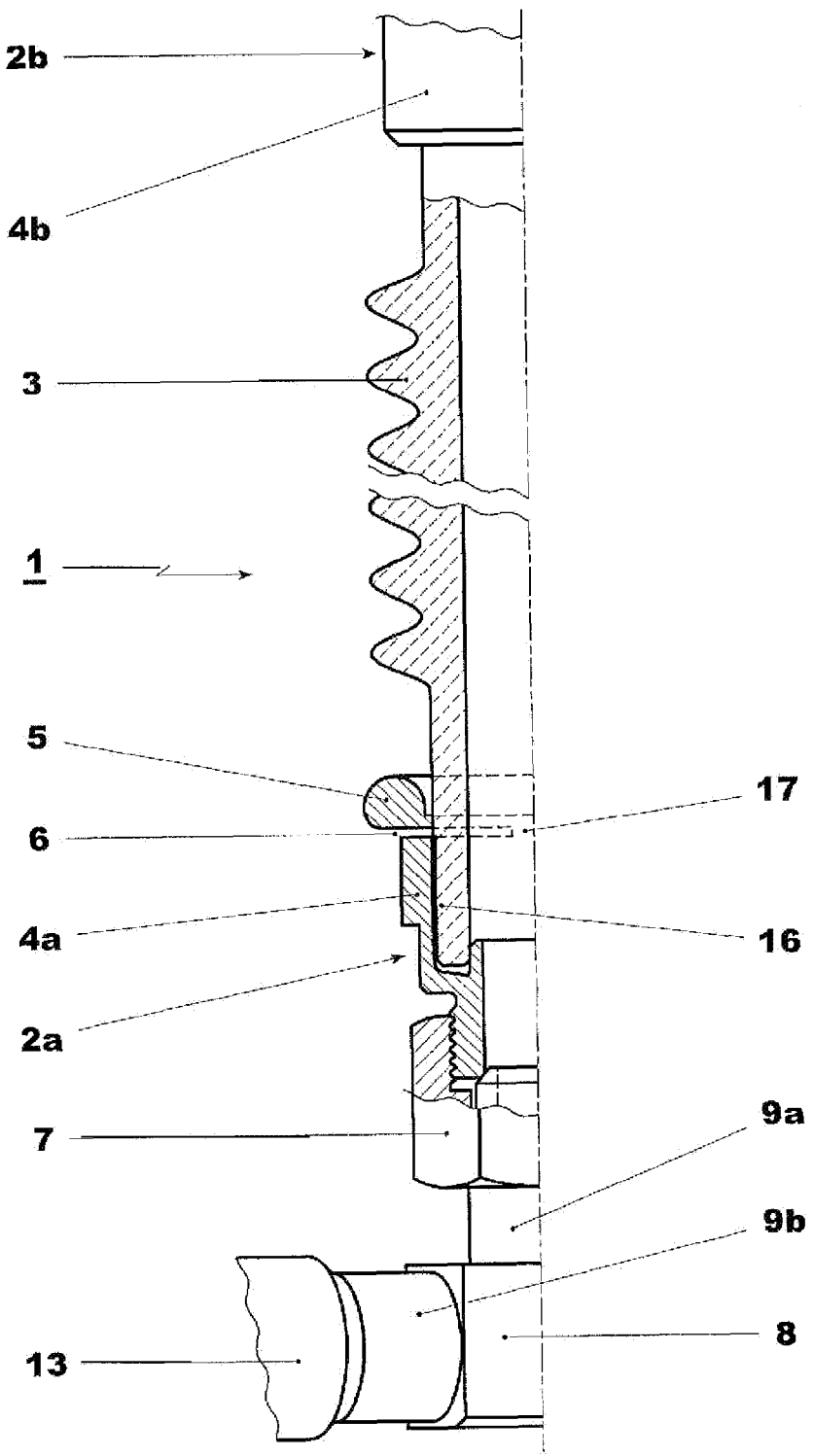
FIG. 1 shows a plan view of a section, positioned partially along one axis, through a part, located to a left of the axis, of a first exemplary embodiment of a high-voltage isolator according to the disclosure, with two connecting pieces attached to the isolating body.

The reference symbols used in the drawings, and their meanings, are listed in summarized form in the list of reference symbols. In principle, identical parts or parts having the same effect are provided with the same or similar reference symbols in the figures. Parts which are not essential for understanding of the disclosure are in some cases not illustrated. The described exemplary embodiments represent an example of the subject matter according to the disclosure, and have no restrictive effect.

DETAILED DESCRIPTION

A high-voltage isolator is disclosed which can withstand thermal and mechanical loads, and which can ensure that electrical fields are unified to a high degree. A heat pipe and a high-voltage circuit breaker having a high-voltage isolator are also disclosed which can ensure greater reliability and a long life.

An exemplary high-voltage isolator according to the disclosure has two electrical connecting pieces and an electrical isolating body in order to form an electrical isolating gap between the two connecting pieces. The isolating body extends between the two connecting pieces, and connects the connecting pieces physically to one another in the area of their end sections. An annular electrical field control element is arranged on at least one of the annular end sections, and there is at least one slot between the end section and the field control element, which are formed integrally. This therefore means that at least one of the connecting pieces is formed from a first end section and a field control element, and has a slot such as this along its circumference. When the high-voltage isolator is used in an electrical apparatus or an electrical installation, the field control element can prevent electrical flashovers from occurring as a result of an inhomogeneous electrical field. At the same time, because of the elastic deformability of the end section, no powerful mechanical forces resulting from a lateral contraction due to temperature changes are passed into the area of the end section. The circumferential slot therefore provides mechanical decoupling between the field control element and the end section, without adversely affecting the operation of the field control element as such. Because of the formation of one or more such openings in the form of slots, the field control element is now connected like a web to the end section only at individual points, and is effectively electrically conductively supported on the end section. In this case, a slot means an elongated opening in the material which, for example, may also be an elongated hole or a sequence of holes in a row, thus forming an elongated opening.

Furthermore, an exemplary heat pipe according to the disclosure can have a high-voltage isolator according to the disclosure, wherein a connecting piece of the high-voltage isolator forms a section of an evaporator, and a second connecting piece is coupled to a condenser. A heat pipe includes a heat transmitter which makes use of the latent heat of evaporation of a working medium to allow a high heat flow density between the section of the heat pipe referred to as the evaporator and the section of the heat pipe referred to as the condenser. The heat pipe forms an intrinsically closed circuit, in which the working medium can circulate. In this case, there need be no rigid connection between the various sections such as the evaporator, high-voltage isolator and the condenser. In fact, a heat pipe according to the disclosure also includes a heat pipe which has a flexibly moving connection between the evaporator, condenser and high-voltage isolator, for example by means of hose pieces or bellows.

The tangentially circumferential slot can be arranged between the field control element and the end section. The slot therefore bounds the end section toward the field control element. The field control element, which has a stiffening effect because of its toroidal shape, is therefore largely decoupled from the end section. The presence of at least one slot therefore can result in at least one web being formed between the field control element and the end section, by means of which the field control element is electrically and mechanically connected to the end section. Depending on the material properties and the wall thickness of the end section, the number and length, and therefore the number of webs formed, may be varied. By way of example, two circumferential slots of the same length may be provided, thus resulting in two opposite webs being formed, which support the field control element on the end section. It is also possible to form three circumferential slots, thus forming three webs. A symmetrical arrangement of the slots can ensure that the field control element is supported uniformly on the end section.

An exemplary high-voltage isolator 1 as illustrated in FIG. 1 has an axially symmetrical isolating body 3 in the form of a hollow cylinder. In an exemplary embodiment, the isolating body 3 is composed of a ceramic (for example $Al_2O_3$), glass or may be manufactured from an epoxy which is filled with particles such as silanized quartz powder, wollastonite, or glass fibers. Metallic annular connecting pieces 2a, 2b which, for example, are manufactured from aluminum or steel, are attached to each of the two ends of the electrically isolating hollow body 3. The high-voltage isolator 1 is in the form of a high-voltage hollow isolator 1.

By way of example, the connecting pieces 2a, 2b can be attached to the isolating body 3 by adhesively bonding the end of the isolating body 3 in a gas-tight manner into the respective hollow connecting piece 2a, 2b. In this case, the isolating body 3 ensures a defined isolation gap between the two connecting pieces 2a and 2b. This isolation gap should, for example, be able to withstand a weighted voltage (e.g., of about 10 kV to 40 kV or more or less as specified) which is applied to the switch permanently, as well as transient overvoltages, which are applied briefly to the switch, such as a switching voltage or lightning surge voltage (e.g., 100 kV or several 100 kV or more or less as specified). The connecting piece 2a may be at ground potential and may then be electrically conductively connected to a metal housing while, in contrast, the connecting piece 2b may be at high-voltage potential, and may then be connected to a contact arrangement of a high-voltage switch.

On its side facing away from the isolating body 3, the connecting piece 2a has a screw thread, by means of which the connecting piece 2a can be flange-connected to a tubular connection piece 7. This allows the components to be connected to the connecting piece 2a to be replaced easily. In addition, seals located between the screw connection may also be provided, for a gas-tight screw connection. An angle piece 8 is attached to the connection piece 7, and has two connecting stubs 9a, 9b, which are arranged at an angle to one another. The two connecting stubs 9a, 9b are connected to one another by means of a channel. A metallic hose piece 13 is attached to the connecting stub 9b and leads away transversely with respect to the longitudinal axis of the isolating body 3. The angle at which the hose piece 13 is led away is, for example, 90°. The hose piece 13 is used for gas-tight connection and at the same time for mechanical decoupling of the high-voltage isolator 1 and, for example, the housing of a high-voltage switch. For this purpose, by way of example, the hose piece 13 may be in the form of metallic bellows or a flexible metal hose. Fluids can be carried in the interior of the high-voltage isolator 1, which is connected in a gas-tight and pressure-tight manner to the hose piece 13 via the angle piece 8, the connection piece 7 and the connecting pieces 2a, 2b.

On the side facing the isolating body 3, the connecting piece 2a has an end section 4a through which the isolating body 3 is passed, and to which the isolating body 3 is adhesively bonded. The adhesive layers 16 are located between the inner wall of the annular end section 4a and the annular section of the outer wall of the isolating body 3, and this section is passed into the connecting piece 2a. The adhesive layers 16 result in a gas-tight connection between the isolating body 3 and the connecting piece 2a. The end section 4b of the connecting piece 2b can also be connected in a gas-tight manner to the isolating body 3 in the same or similar manner.

The annular end section 4a of the connecting piece 2a has a field control element 5 which is in the form of a toroidal ring body with a diameter which is greater than the diameter of the annular end section 4a. The end section 4a is bounded toward the isolating body 3 by the field control element 5. The width and diameter of the toroidal field control element 5 are chosen such that the electrical field which acts during operation of the high-voltage isolator 1 is unified in the isolating gap such that field peaks, and therefore electrical flashovers, can be prevented in the area of the isolating gap. The toroidal wall of the field control element 5 can have a completely closed surface thus resulting in considerably better homogenization of the field that acts, in comparison to a field control electrode whose surfaces have depressions, holes or slots, thus forming a plurality of surface elements or segmented surfaces.

In those sections of the connecting pieces 2a, 2b which face the isolating body 3, the wall thickness of the connecting pieces 2a, 2b can be defined such that, in the event of any longitudinal or lateral contraction of the isolating body, the end sections 4a, 4b can deform elastically, and such that the end sections 4a, 4b are loaded with forces which are considerably less than those in the case of a rigid holder. For example, forces such as these are tensioned and compression forces acting at right angles to the adhesive layer 16.

The lateral contraction can occur as a result of switching operations or as a result of bending forces when there are severe mechanical loads on the high-voltage isolator 1, but this is caused for example by temperature changes which occur during operation or result from the ambient temperature to which the high-voltage isolator 1 is subject. Since the thermal coefficient of expansion of the isolating body 3 can be considerably greater than that of the end sections 4a, 4b, the isolating body 3 is compressed in an annular area, bounded by the rigid end sections 4a, 4b, in the event of a temperature increase while, in contrast, the isolating body 1 can expand without any impediment in the area of the isolating gap, that is to say outside the end sections 4a, 4b. In the process, stresses in the isolating body act in the adhesive layers 16 on the end sections 4a, 4b, and produce radially directed forces.

Since the isolating body 3 is connected by means of the adhesive layers 16 to the elastically deformable end sections 4a, 4b, the isolating body 1 can expand in the area of the end sections 4a, 4b in the event of a temperature increase, without unacceptably high stresses occurring there. High local shear and tension forces in the end sections 4a, 4b, and therefore delamination or splitting of the adhesive layers 16 that are present in the end sections, or tearing of the isolating body 3, can therefore be prevented.

Two slots 6 are formed between the annular end section 4a of the connecting piece 2a and the toroidal field control element 5 in the circumferential direction of the end section 4a, such that the field control element 5 is electrically conductively connected to the end section 4a, and is supported securely by the end section 4a, by means of two webs 17 which are formed by the slots 6. The slots 6 can be produced, for example, by milling from the end section 4a and are designed such that the two webs 17 are opposite one another and are separated from one another by the diameter of the end section 4a. The slots 6 which are formed in the circumferential direction of the end section 4a decrease the mechanical stiffness of the connecting piece 2a, caused by the toroidal shape of the field control element 5, in the area facing the isolating body 3, and therefore improve its elastic deformation. The field control element 5 formed in this way, which is for example formed from a single piece with the end section 2a, ensures that the end section 4a has a virtually elastic behavior, which could otherwise be achieved, for example, only without the presence of the field control element 5. The internal diameter of the field control element 5 is in one section equal to the internal diameter of the end section 4a.

Figure 2:
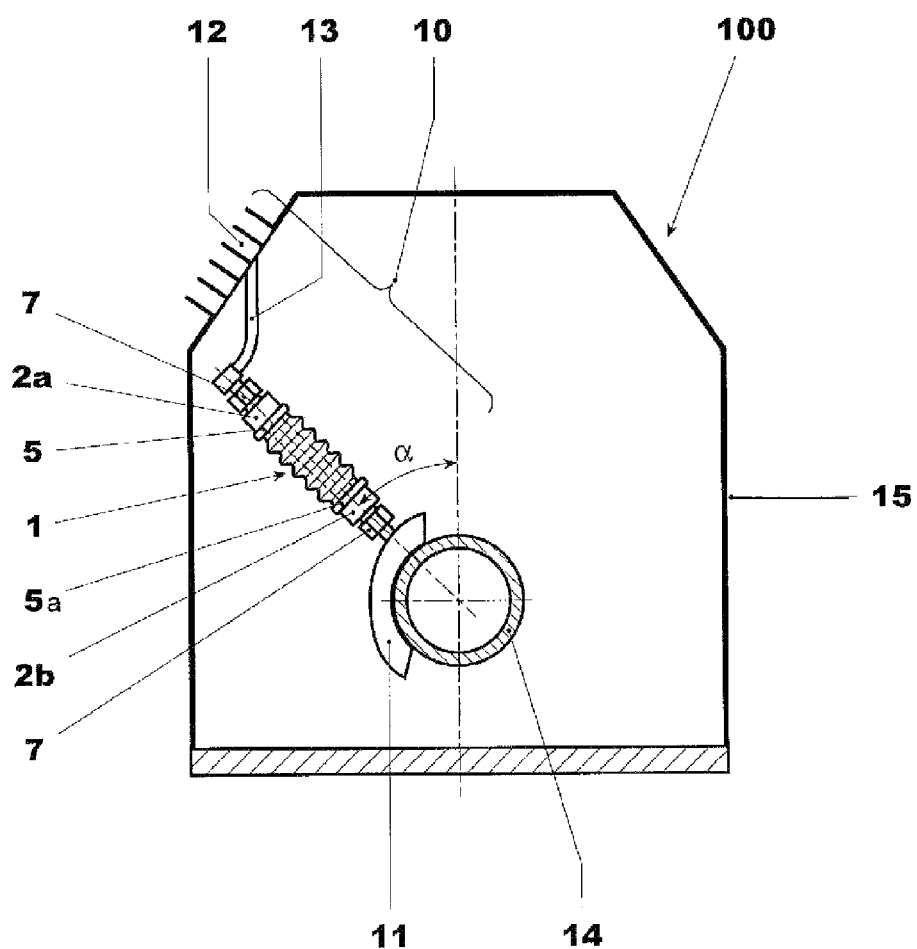
FIG. 2 shows a plan view of an exemplary embodiment of a high-voltage switch, in which a second embodiment of the high-voltage isolator according to the disclosure extends between the inner conductor and the outer conductor.

FIG. 2 shows the section through a switch pole 100 of a generator switch. The switch pole 100 has a tubular inner electrical conductor 14 which is surrounded by a housing-like encapsulation 15 which acts as an outer conductor. During operation, there is a high voltage HV between the inner conductor and the respective outer conductor, with the outer conductor being at ground potential G. The heat losses to be dissipated are created on the inner conductor, which for example has a smaller cross section than the outer conductor, while the outer conductor is subject to the surrounding air and is heated to a lesser extent.

In order to dissipate heat losses from the electrical conductor 14, the electrical conductor 14 is cooled by at least one cooling element which is in the form of a heat pipe 10. The heat pipe 10 contains a working medium which is vaporized in a section of the heat pipe 10 which is referred to as an evaporator 11, and is condensed in a section of the heat pipe 10 which is referred to as a condenser 12. The condenser 12 has a cooling rib structure on the outside of the encapsulation 15, and is electrically conductively connected to the encapsulation 15. The connecting piece 2a is kept at ground potential via the encapsulation 15 and the hose piece 13, and projects like a finger in the direction of the electrical conductor 14. The connecting piece 2a is therefore located in an exposed position in the electrical field area of the electrical conductor 14. Undesirable electrical field peaks, and therefore electrical flashovers, can therefore occur in the area of the isolating gap or on the adhesive layer 16, which is the connection point between the electrical isolating body 3 and the metallic end section 4a. These flashovers can be prevented and the electrical field homogenized by a high-voltage isolator 1 as is shown in FIG. 1, and by a further exemplary embodiment as is shown in FIG. 2. In FIG. 2, the condenser 12 and the evaporator 11 are connected to one another via the high-voltage isolator 1.

When the heat pipe 10 is in the installed state, the longitudinal axis of the high-voltage isolator 1 is tilted through an angle α with respect to the vertical axis of the switch pole 100. Because the hose piece 13 is arranged laterally with respect to the longitudinal axis of the high-voltage isolator 1, the gravity force effect of the heat pipe 10 can be improved since it is easier for the condensed working medium to flow back in the area of the hose piece 13.

As shown in FIG. 2, at each of its two ends, the high-voltage isolator 1 has a connecting piece 2a and 2b, which is provided with a screw thread, in a manner that can be advantageous for manufacture and assembly. Furthermore, each of the two end sections 4a, 4b is bounded in the direction of the isolating body 3 by a field control element 5, which is connected to the respective end section 4a and 4b by means of the webs 17 formed by the slots 6. This configuration can, for example, ensure that the high-voltage isolator 1 can be replaced easily.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 High-voltage isolator
2a, 2b Connecting piece
3 Isolating body
4a, 4b End section
5, 5a Field control element
6 Slot, opening in the form of a slot
7 Connection piece
8 Angle piece
9a, 9b Connecting stub
10 Head pipe, cooling element 11 Evaporator
12 Condenser
13 Hose piece
14 Electrical conductor
15 Encapsulation
16 Adhesive layers
17 Web
100 Switch pole

What is claimed is:

1. A high-voltage isolator comprising:
a first hollow electrical connecting piece;
a second hollow electrical connecting piece;
an electrical isolating body which extends between the first connecting piece and the second connecting piece and is connected in a gas-tight manner to an end section of the first connecting piece and to an end section of the second connecting piece;
an annular field control element integrally formed on at least one of the end sections; and
at least one slot, which extends in the circumferential direction of the at least one end section, between the at least one end section and the field control element, for mechanical decoupling the field control element from the at least one end section.

2. The high-voltage isolator as claimed in claim 1, wherein the at least one slot bounds an end section which faces the field control element.

3. The high-voltage isolator as claimed in claim 2, wherein the at least one slot forms at least one web by which the field control element and the end section are connected to one another.

4. The high-voltage isolator as claimed in claim 3, wherein the end sections are annular, and the annular field control element is toroidal.

5. The high-voltage isolator as claimed in claim 4, wherein the end sections are fixed to the isolating body by an adhesive layer which is arranged between an inner wall of the end sections and a section of an outer wall of the isolating body.

6. The high-voltage isolator as claimed in claim 1, wherein the at least one slot forms at least one web by which the field control element and the end section are connected to one another.

7. The high-voltage isolator as claimed in claim 6, wherein the slot is placed to reduce mechanical stiffening of the end section, in a radial direction, caused by the annular field control element.

8. The high-voltage isolator as claimed in claim 1, wherein the end sections are annular, and the annular field control element is toroidal.

9. The high-voltage isolator as claimed in claim 1, wherein the end sections are fixed to the isolating body by an adhesive layer which is arranged between an inner wall of the end sections and a section of an outer wall of the isolating body.

10. A heat pipe comprising:
a condenser;
an evaporator; and
a high-voltage isolator, which forms an electrical isolating gap between the evaporator and the condenser and has a first hollow electrical connecting piece, a second hollow electrical connecting piece and an electrical isolating body, wherein the isolating body extends between the first connecting piece and the second connecting piece and is connected in a gas-tight manner to an end section of the first connecting piece and to an end section of the second connecting piece, and wherein a field control element is arranged at least on one of the end sections, wherein a connection between the at least one end section and the field control element has at least one slot which extends in a circumferential direction of the at least one end section, for mechanical decoupling of the field control element from the at least one end section.

11. The heat pipe as claimed in claim 10, wherein the first connecting piece forms a section of the evaporator, and the second connecting piece of the high-voltage isolator is coupled to a condenser.

12. The heat pipe as claimed in claim 11, wherein the first connecting piece is connected to the evaporator via a flexible hose piece.

13. The heat pipe as claimed in claim 12, wherein the first connecting piece has a connecting flange for detachable attachment of the hose piece.

14. The heat pipe as claimed in claim 13, wherein the first connecting piece is formed integrally with the field control element, and the second connecting piece is formed integrally with a further field control element, and each of the first and the second connecting pieces have a slot.

15. The heat pipe as claimed in claim 14, wherein the evaporator is thermally and electrically coupled to an electrical conductor, and wherein the condenser is thermally and electrically coupled to an encapsulation which encloses the electrical conductor.

16. The heat pipe as claimed in claim 15, wherein the first connecting piece projects like a finger out of the encapsulation, which is at ground potential.

17. The heat pipe as claimed in claim 12, wherein the hose piece is routed transversely with respect to a longitudinal axis of the isolating body.

18. The heat pipe as claimed in claim 10, wherein the first connecting piece is formed integrally with the field control element, and the second connecting piece is formed integrally with a further field control element, and both the first and the second connecting pieces have a slot.

19. The heat pipe as claimed in claim 10, in combination with a generator switch wherein the evaporator is thermally and electrically coupled to an electrical conductor, and wherein the condenser is thermally and electrically coupled to an encapsulation which encloses the electrical conductor.

20. The heat pipe as claimed in claim 19, wherein the first connecting piece projects like a finger out of the encapsulation, which is at ground potential.

* * * * *